US012713295B2

(12) United States Patent
Wu et al.

(10) Patent No.: US 12,713,295 B2
(45) Date of Patent: Aug. 18, 2026

(54) METHOD AND APPARATUS FOR OBTAINING TRAFFIC CHARACTERISTIC ANALYSIS RESULT, AND NETWORK SIDE DEVICE

(71) Applicant: viVO MOBILE COMMUNICATION CO., LTD., Dongguan (CN)

(72) Inventors: Xiaobo Wu, Dongguan (CN); Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 164 days.

(21) Appl. No.: 18/534,556

(22) Filed: Dec. 8, 2023

(65) Prior Publication Data

US 2024/0107379 A1 Mar. 28, 2024

Related U.S. Application Data

(63) Continuation of application No. PCT/CN2022/097136, filed on Jun. 6, 2022.

(30) Foreign Application Priority Data

Jun. 10, 2021 (CN) ......................... 202110649960.0

(51) Int. Cl.
*H04W 28/12* (2009.01)
*H04L 43/0894* (2022.01)
(Continued)

(52) U.S. Cl.
CPC ......... *H04W 28/12* (2013.01); *H04L 43/0894* (2013.01); *H04W 28/06* (2013.01); *H04W 28/20* (2013.01)

(58) Field of Classification Search
CPC ..... H04W 28/06; H04W 28/12; H04W 28/20; H04L 43/022; H04L 43/028;
(Continued)

(56) References Cited

U.S. PATENT DOCUMENTS 9,967,178 B1 * 5/2018 K S ......................... H04L 45/38
10,419,351 B1 9/2019 Baldi et al.
(Continued)

FOREIGN PATENT DOCUMENTS

CN 101188747 A 5/2008
CN 101697554 A 4/2010
(Continued)

OTHER PUBLICATIONS

Extended European Search Report issued in related European Application No. 22819483.3, mailed Aug. 20, 2024, 10 pages.
(Continued)

*Primary Examiner* — Jerry B Dennison
(74) *Attorney, Agent, or Firm* — IPX PLLC

(57) ABSTRACT

This application discloses a method and a network side device for obtaining a traffic characteristic analysis result. The method includes: receiving, by a first network side device, a request message sent by a second network side device, where the request message carries identification information of a target service flow; obtaining, by the first network side device, traffic characteristic information of the target service flow from a communication network based on the identification information of the target service flow; and obtaining a traffic characteristic analysis result of the target service flow based on the traffic characteristic information of the target service flow, where the traffic characteristic analysis result includes: first indication information or second indication information, the first indication information indicates importance of the target service flow, and the second indication information indicates a data unit to which the target service flow belongs.

18 Claims, 5 Drawing Sheets

(51) Int. Cl.
*H04W 28/06* (2009.01)
*H04W 28/20* (2009.01)

(58) Field of Classification Search
CPC . H04L 43/062; H04L 43/026; H04L 43/0894; H04L 43/04; H04L 41/147; H04L 41/16; H04L 41/145; H04L 41/14
See application file for complete search history.

(56) References Cited

U.S. PATENT DOCUMENTS

| | | | |
|---|---|---|---|
| 11,140,047 | B2 * | 10/2021 | Shan .................. H04L 41/0895 |
| 2002/0023089 | A1 * | 2/2002 | Woo .................... H04L 63/0263 |
| 2014/0313989 | A1 | 10/2014 | Doken et al. |
| 2019/0379605 | A1 * | 12/2019 | Pfister .................... G06N 3/045 |
| 2020/0228420 | A1 | 7/2020 | Dao et al. |
| 2021/0099367 | A1 * | 4/2021 | Han ...................... H04L 43/026 |
| 2021/0112478 | A1 | 4/2021 | Dannebro et al. |
| 2021/0168665 | A1 * | 6/2021 | Salkintzis ............. H04W 12/02 |
| 2023/0262098 | A1 * | 8/2023 | Muñoz De La Torre Alonso ....... H04L 47/822 709/224 |
| 2023/0336432 | A1 * | 10/2023 | Muñoz De La Torre Alonso ....... H04L 12/1407 |

FOREIGN PATENT DOCUMENTS

| | | | | |
|---|---|---|---|---|
| CN | 102045363 | A | 5/2011 | |
| CN | 105099803 | A | 11/2015 | |
| CN | 110324198 | A | 10/2019 | |
| CN | 111049757 | A | 4/2020 | |
| EP | 3691209 | A1 | 8/2020 | |
| WO | 2009086771 | A1 | 7/2009 | |
| WO | WO-2021063515 | A1 * | 4/2021 | ......... H04L 41/0894 |

OTHER PUBLICATIONS

International Search Report issued in corresponding International Application No. PCT/CN2022/097136, mailed Sep. 2, 2022, 6 pages.

* cited by examiner

Consumer end
NWDAF
AF
UPF
301
302
303
304
305
306

500
501
First receiving module
502
First obtaining module
504
Training module
503
Second obtaining module
505
First sending module

METHOD AND APPARATUS FOR OBTAINING TRAFFIC CHARACTERISTIC ANALYSIS RESULT, AND NETWORK SIDE DEVICE

CROSS-REFERENCE TO RELATED APPLICATIONS

This application is a continuation of International Application No. PCT/CN2022/097136, filed Jun. 6, 2022, which claims priority to Chinese Patent Application No. 202110649960.0, filed Jun. 10, 2021. The entire contents of each of the above-referenced applications are expressly incorporated herein by reference.

TECHNICAL FIELD

This application relates to the field of wireless communication technologies, and in particular, to a method and an apparatus for obtaining a traffic characteristic analysis result, and a network side device.

BACKGROUND

In the related art, data of a video stream in extended Reality (XR) may be classified as an I frame, a P frame, and a B frame. The I frame is also referred to as an independent decoding frame. A frame between I frames is the P frame or the B frame. The I frame associated with the P frame or the B frame is an I frame closest to the P frame or the B frame on a timeline. Decoding cannot be performed due to lack of the I frame, but the I frame can be independently decoded in a case of lacking of a non-I frame, that is, importance of the I frame is higher than that of the non-I frame. In other words, in a case that sending of the I frame fails, it is meaningless to continue to send the non-I frame (for example, the P frame or the B frame) associated with the I frame. The I frame and the non-I frame (the P frame or the B frame) associated with the I frame form an Application Data Unit (ADU).

However, in the related art, in a scenario of mapping XR service data into a Quality of Service (Qos) flow, a communication network cannot identify which Internet Protocol (IP) packets of the QoS flow belong to the I frame and which IP packets belong to the non-I frame. As a result, a network side device cannot distinguish importance of a target service flow and/or a data unit to which the target service flow belongs, and cannot effectively transmit the target service flow.

SUMMARY

Embodiments of this application provide a method and an apparatus for obtaining a traffic characteristic analysis result, and a network side device.

According to a first aspect, a method for obtaining a traffic characteristic analysis result is provided, including: receiving, by a first network side device, a request message sent by a second network side device, where the request message carries identification information of a target service flow; obtaining, by the first network side device, traffic characteristic information of the target service flow from a communication network based on the identification information of the target service flow; and obtaining a traffic characteristic analysis result of the target service flow based on the traffic characteristic information of the target service flow, where the traffic characteristic analysis result includes: first indication information and/or second indication information, the first indication information indicates importance of the target service flow, and the second indication information indicates a data unit to which the target service flow belongs.

According to a second aspect, an apparatus for obtaining a traffic characteristic analysis result is provided, including: a first receiving module, configured to receive a request message sent by a second network side device, where the request message carries identification information of a target service flow; a first obtaining module, configured to obtain traffic characteristic information of the target service flow from a communication network based on the identification information of the target service flow; and a second obtaining module, configured to obtain a traffic characteristic analysis result of the target service flow based on the traffic characteristic information of the target service flow, where the traffic characteristic analysis result includes: first indication information and/or second indication information, the first indication information indicates importance of the target service flow, and the second indication information indicates a data unit to which the target service flow belongs.

According to a third aspect, a service flow scheduling method is provided, including: sending, by a second network side device, a request message to a first network side device, where the request message carries identification information of a target service flow; receiving a traffic characteristic analysis result of the target service flow returned by the first network side device, where the traffic characteristic analysis result includes: first indication information and/or second indication information, the first indication information indicates importance of the target service flow, and the second indication information indicates a data unit to which the target service flow belongs; and scheduling the target service flow based on the traffic characteristic analysis result of the target service flow.

According to a fourth aspect, a service flow scheduling apparatus is provided, including: a second sending module, configured to send a request message to a first network side device, where the request message carries identification information of a target service flow; a second receiving module, configured to receive a traffic characteristic analysis result of the target service flow returned by the first network side device, where the traffic characteristic analysis result includes: first indication information and/or second indication information, the first indication information indicates importance of the target service flow, and the second indication information indicates a data unit to which the target service flow belongs; and a scheduling module, configured to schedule the target service flow based on the traffic characteristic analysis result of the target service flow.

According to a fifth aspect, a network side device is provided, including a processor, a memory, and a program or instructions stored in the memory and executable on the processor, where when executed by the processor, the program or the instructions implement the steps of the method according to the first aspect or implement the steps of the method according to the third aspect.

According to a sixth aspect, a network side device is provided, including a processor and a communication interface, where the processor is configured to implement the steps of the method according to the first aspect or implement the steps of the method according to the third aspect, and the communication interface is configured to communicate with an external device.

According to a seventh aspect, a readable storage medium is provided, storing a program or instructions, where when executed by a processor, the program or the instructions implement the steps of the method according to the first aspect or implement the steps of the method according to the third aspect.

According to an eighth aspect, a chip is provided, including a processor and a communication interface, where the communication interface is coupled to the processor, and the processor is configured to run a program or instructions to implement the steps of the method according to the first aspect or implement the steps of the method according to the third aspect.

According to a ninth aspect, a computer program/program product is provided, stored in a non-transient storage medium, where the program/program product is executed by at least one processor to implement the steps of the method according to the first aspect or implement the steps of the method according to the third aspect.

In the embodiments of this application, when receiving a request message carrying identification information of a target service flow, a first network side device obtains traffic characteristic information of the target service flow from a communication network based on the identification information of the target service flow, and then obtains, based on the traffic characteristic information of the target service flow, importance of the target service flow and/or a data unit to which the target service flow belongs. Therefore, the network side device can distinguish the importance of the target service flow and/or the data unit to which the target service flow belongs, and can further perform optimization such as scheduling according to the importance of the target service flow and/or the data unit to which the target service flow belongs, to improve service data transmission efficiency.

DETAILED DESCRIPTION

The technical solutions in the embodiments of this application are clearly described below with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

The specification and claims of this application, and terms “first” and “second” are used to distinguish similar objects, but are not used to describe a specific sequence or order. It should be understood that the terms used in such a way are interchangeable in appropriate circumstances, so that the embodiments of this application can be implemented in orders other than the order illustrated or described herein. In addition, the objects distinguished by “first” and “second” are usually of a same type, without limiting a quantity of objects, for example, there may be one or more first objects. In addition, “and/or” in the description and the claims means at least one of the connected objects, and the character “/” in this specification generally indicates an “or” relationship between the associated objects.

It should be noted that the technologies described in the embodiments of this application are not limited to a Long Term Evolution (LTE)/LTE-Advanced (LTE-A) system, and can be further used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms “system” and “network” in the embodiments of this application are often used interchangeably, and the described technologies can be used not only for the above-mentioned systems and radio technologies, but also for other systems and radio technologies. The following description describes a New Radio (NR) system for exemplary purposes, and uses NR terms in most of the following descriptions, but these technologies are also applicable to applications other than the NR system application, such as a 6th Generation (6G) communication system.

Figure 1:
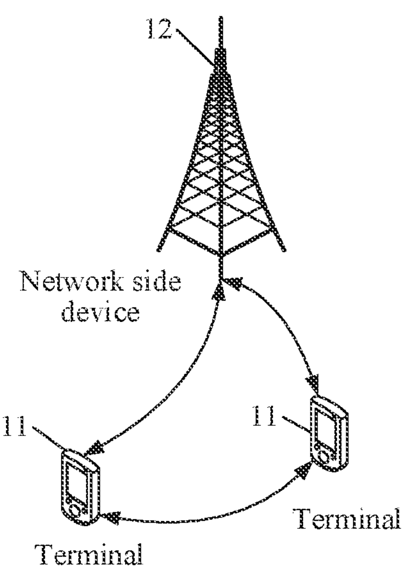
FIG. 1 is a schematic diagram of a wireless communication system to which an embodiment of this application is applicable.

FIG. 1 is a schematic diagram of a wireless communication system to which an embodiment of this application is applicable. The wireless communication system includes a terminal II and a network side device 12. The terminal 11 may also be referred to as a terminal device or a User Equipment (UE). The terminal 11 may be a mobile phone, a tablet computer, a laptop computer or referred to as a notebook computer, a Personal Digital Assistant (PDA), a palmtop computer, an netbook, an ultra-mobile personal computer (UMPC), a Mobile Internet Device (MID), a wearable device, or vehicular user equipment (VUE), pedestrian user equipment (PUE), and other terminal-side devices. The wearable device includes a smartwatch, bands, headsets, glasses, or the like. It should be noted that, a specific type of the terminal 11 is not limited in this embodiment of this application. The network side device 12 may be a base station or a core network. The base station may be referred to as a Node B, an evolved Node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a WLAN access point, a Wi-Fi node, a Transmitting Receiving Point (TRP), or some other suitable term in the field, provided that a same technical effect is achieved. The base station is not limited to a specific technical term. It should be noted that, in this embodiment of this application, only a base station in an NR system is used as an example, but the specific type of the base station is not limited. The core network includes, but not limited to, a Network Data analytics Function (NWDAF), a User Plane Function (UPF), an Application Function (AF), a Session Management Function (SMF), a Network Function (NF), and the like.

The technical solutions provided in the embodiments of this application are described in detail below with reference to the accompanying drawings by using some embodiments and application scenarios thereof.

Figures 2, 3:
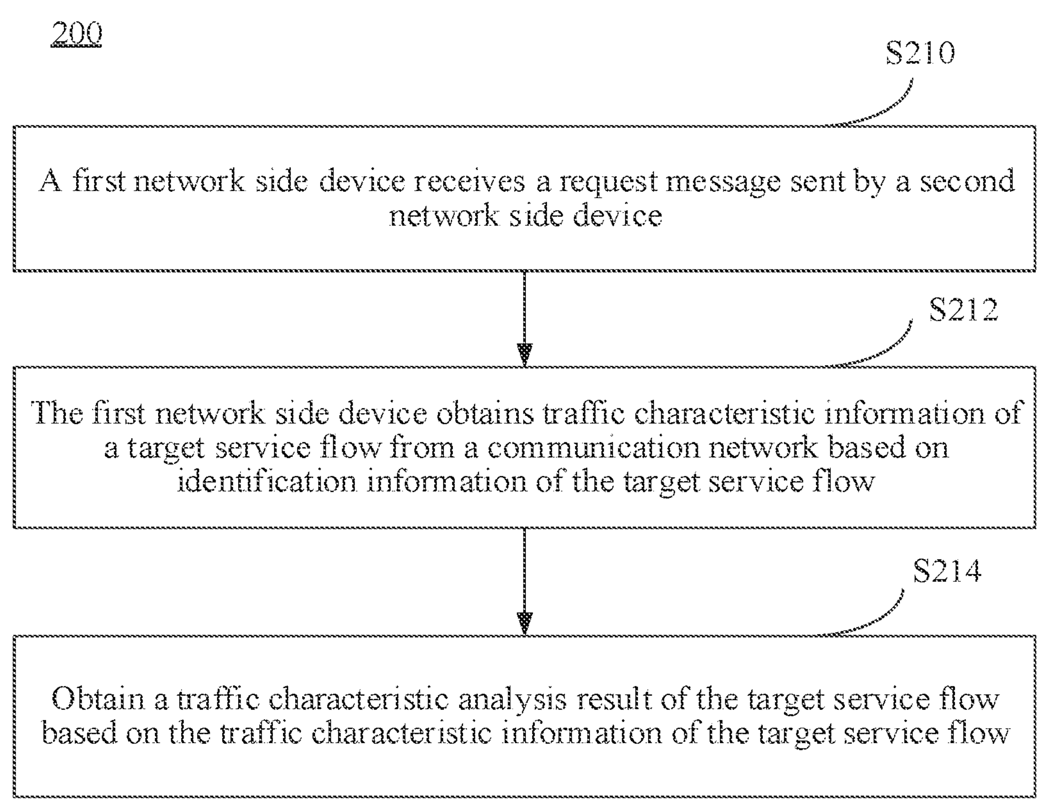
FIG. 2 is a flowchart of a method for obtaining a traffic characteristic analysis result according to an embodiment of this application.
FIG. 3 is another flowchart of a method for obtaining a traffic characteristic analysis result according to an embodiment of this application.

FIG. 2 is a schematic flowchart of a method 200 for obtaining a traffic characteristic analysis result according to an embodiment of this application. The method 200 may be performed by a first network side device. In other words, the method may be performed by software or hardware installed on the first network side device. As shown in FIG. 2, the method may include the following steps.

S210. A first network side device receives a request message sent by a second network side device, where the request message carries identification information of a target service flow.

The second network side device may be a network function on a consumer end (NF Consumer), for example, an Access and Mobility Management Function (AMF), a Session Management Function (SMF), or a User Plane Function (UPF).

The request message requests the first network side device (for example, an NWDAF) to obtain importance of the target service flow and/or a data unit to which the target service flow belongs.

The identification information may include a service flow feature identifier (Analytics ID) and/or a service flow filtering information (Analytics Filter). The service flow filtering information may include at least one of the following (1) to (4).

(1) Application identifier (ID): may also be referred to as a service identifier. The first network side device may obtain, in a manner of obtaining a traffic characteristic analysis result of a service flow corresponding to the application identifier, the traffic characteristic analysis result of the service flow corresponding to the application identifier.

(2) Slice identifier (S-NSSAI). The first network side device may obtain, in a manner of obtaining a traffic characteristic analysis result of a service flow corresponding to the slice identifier, the traffic characteristic analysis result of the service flow corresponding to the slice identifier.

(3) Data network name (DNN). The first network side device may obtain, in a manner of obtaining a traffic characteristic analysis result of a service flow corresponding to the data network name, the traffic characteristic analysis result of the service flow corresponding to the data network name.

(4) Area information (Area of Interest). The first network side device may obtain, in a manner of obtaining a traffic characteristic analysis result of a service flow corresponding to the area information, the traffic characteristic analysis result of the service flow corresponding to the area information.

S212. The first network side device obtains traffic characteristic information of the target service flow from a communication network based on the identification information of the target service flow.

In this embodiment of this application, after receiving the request message, the first network side device obtains the traffic characteristic information of the target service flow from the communication network.

In some embodiments, the traffic characteristic information may include: a service flow identifier and second traffic information of a service flow, where the second traffic information of the service flow includes at least one of the following: a start time and/or an end time of the service flow, a traffic volume of the service flow, a traffic duration of the service flow, an observation bandwidth of the service flow, a quantity of observation packets of the service flow, an average interval of an IP packet, or an average size of the IP packet.

In some embodiments, the service flow identifier may be an IP 5-tuple, that is, the service flow identifier may include: a terminal IP address, a terminal port number, a server IP address, a server port number, and a protocol number.

S214. Obtain a traffic characteristic analysis result of the target service flow based on the traffic characteristic information of the target service flow, where the traffic characteristic analysis result includes: first indication information and/or second indication information, the first indication information indicates importance of the target service flow, and the second indication information indicates a data unit to which the target service flow belongs.

In an implementation of this embodiment of this application, the first network side device may obtain the traffic characteristic analysis result of the target service flow by using a service traffic characteristic model, where the service traffic characteristic model is configured to output a corresponding traffic characteristic analysis result according to inputted traffic characteristic information. Therefore, in the implementation, S214 may include: inputting the traffic characteristic information of the target service flow into a service traffic characteristic model, and obtaining the traffic characteristic analysis result of the target service flow by using the service traffic characteristic model, where the service traffic characteristic model is configured to analyze and output a corresponding traffic characteristic analysis result according to inputted traffic characteristic information. That is, the first network side device inputs the traffic characteristic information of the target service flow into the service traffic characteristic model, to obtain the traffic characteristic analysis result of the target service flow outputted by the service traffic characteristic model.

In an implementation, to improve accuracy of the traffic characteristic analysis result outputted by the service traffic characteristic model, before S214, the first network side device may train the service traffic characteristic model. Therefore, in the implementation, before S214, the method may include the following steps Step 1. Collect traffic characteristic information of a sample service flow from the communication network.

Step 2. Collect service information of the sample service flow from an application server (for example, an AF).

Step 3. Train the service traffic characteristic model based on the collected traffic characteristic information of the sample service flow and the collected service information of the sample service flow, to enable the service traffic characteristic model to analyze and output a corresponding traffic characteristic analysis result according to inputted traffic characteristic information. For example, the traffic characteristic information of the sample service flow may be used as an input of the service traffic characteristic model, and a part or all information of the service information of the sample service flow may be used as an output of the service traffic characteristic model, to train the service traffic characteristic model.

In the implementation, the service information includes: a service flow identifier and first traffic information of a service flow, where the first traffic information of the service flow includes: indication information indicating importance of the service flow and/or indication information indicating a data unit to which the service flow belongs. For example, the service information of the sample service flow from collected by the first network side device from the application server may include: an identifier of the sample service flow from and first traffic information (that is, indication information indicating importance of the sample service flow and/or indication information indicating a data unit to which the sample service flow belongs) of the sample service flow.

The service flow identifier may be an IP 5-tuple, that is, the first network side device may obtain the service information of the sample service flow from the application server by using the IP 5-tuple as granularity.

In some embodiments, the first traffic information may further include at least one of the following content.

(1) Indication information indicating a frame type of the service flow, where the indication information may include first identification information and/or second identification information. The first identification information is used for identifying that the sample service flow is an I frame or a non-I frame (for example, a P frame and a B frame). The importance of the sample service flow may also be learned by using the identification information. The second identification information is used for identifying an association relationship between the I frame and the non-I frame (for example, the P frame and the B frame) of the sample service flow, that is, identifying whether the sample service flow belongs to an application data unit. Information about the application data unit of the sample service flow may also be learned by using the identification information.

(2) A start time and/or an end time of the service flow, where a corresponding sample service flow may be identified by using the start time and/or the end time of the sample service flow.

(3) A traffic volume of the service flow, where the traffic volume may include an uplink or downlink traffic volume.

(4) A traffic duration of the service flow, where the traffic duration may include an uplink or downlink traffic duration.

(5) An observation bandwidth of the service flow, where the observation bandwidth may include an uplink or downlink observation bandwidth.

In the implementation, the traffic characteristic information of the sample service flow collected from the communication network may include the identifier of the sample service flow and second traffic information of the sample service flow. The second traffic information of the sample service flow includes at least one of the following: a start time and/or an end time of the sample service flow, a traffic volume of the sample service flow, a traffic duration of the sample service flow, an observation bandwidth of the sample service flow, a quantity of observation packets of the sample service flow, an average interval of an IP packet, an average size of the IP packet, or the like.

In some embodiments, the identifier of the sample service flow may be an IP 5-tuple of the sample service flow, that is, a terminal IP address, a terminal port number, a server IP address, a server port number, and a protocol number that correspond to the sample service flow. That is, the first network side device obtains the sample service flow from the communication network by using the IP 5-tuple as granularity.

In an implementation, to determine the target service flow corresponding to the obtained traffic characteristic analysis result, the traffic characteristic analysis result further includes at least one of the following: a service flow identifier, a start time and/or an end time of a service flow, an application identifier of the service flow, or a traffic duration of the service flow.

The service flow identifier may be an IP 5-tuple, that is, the first network side device may obtain the service information of the sample service flow from the application server by using the IP 5-tuple as granularity.

It should be noted that, in the foregoing implementations, an example in which the traffic characteristic analysis result is obtained by using the service traffic characteristic model is used for description, but is not limited thereto. During an application, the first network side device may not obtain the traffic characteristic analysis result by using the service traffic characteristic model. For example, the first network side device may analyze a rule of traffic characteristic analysis results corresponding to different traffic characteristic information by using information obtained from the communication network and the application server, to predict the traffic characteristic analysis result of the target service flow by using the traffic characteristic information of the target service flow.

In an implementation, after S214, the method may further include: sending the traffic characteristic analysis result of the target service flow to the second network side device. In the implementation, when requiring to obtain the traffic characteristic analysis result of the target service flow, the second network side device may send the request message to the first network side device, to request the traffic characteristic analysis result of the target service flow, and receive the traffic characteristic analysis result of the target service flow returned by the first network side device.

In some embodiments, after S214, the first network side device may further send the traffic characteristic analysis result to a third network side device such as a wireless base station device, to indicate the third network side device to schedule the target service flow based on the traffic characteristic analysis result of the target service flow.

In this embodiment of this application, the data unit may be divided according to an actual application, for example, service flows that need to be transmitted simultaneously may be divided into a data unit. For example, an I frame and a non-I frame that have an association relationship are divided into a same data unit. Because the I frame and the non-I frame (a P frame or a B frame) associated with the I frame form an Application Data Unit (ADU), a packet belonging to the I frame is divided into a same data unit, or a packet belonging to the P frame is divided into a same data unit.

In some embodiments, the data unit may include: an application data unit.

By using the method provided in this embodiment of this application, for a service flow (for example, an XR service flow) carried in a same QoS flow, the first network side device may identify an APP ID of the service flow, importance of the service flow, and a data unit to which the service flow belongs, to perform optimization measures (for example, scheduling optimization) to improve service experience.

FIG. 3 is another schematic flowchart of a method 300 for obtaining a traffic characteristic analysis result according to an embodiment of this application. In FIG. 3, the first network side device is an NWDAF, and the second network side device is a network function on a consumer end (NF Consumer). As shown in FIG. 3, the method 300 mainly includes the following steps.

S301. The NF Consumer sends a request message (for example, Nnwdaf_AnalyticsSubscription_Subscribe, where in the message. Analytics ID=a service flow feature identifier, Analytics Filter (APP ID, S-NSSAI, DNN, Network Area)) to the NWDAF, to request an APP ID corresponding to a target service flow, an importance level of an IP packet of the target service flow, and information about an ADU to which the IP packet belongs. The request message carries the following information:

Analytics ID=service flow feature identifier

Analytics Filter: at least one of App ID, S-NSSAI, DNN, or Network Area, for example, a service limited in a slice.

Application ID: a service identifier, where the NWDAF may train a service identification model (that is, the service traffic characteristic model) for a service corresponding to the App ID, that is, may train different service identification models for different App IDs.

S-NSSAI: a slice identifier, where the NWDAF may specify a service identification model for the slice, that is, may train different service identification models for different slice identifiers.

DNN: a data network name, where the NWDAF may specify a service identification model for a data network corresponding to the DNN, that is, may train different service identification models for different data network names.

Area of Interest: area information, where the NWDAF may specify a service identification model in the area, that is, may train different service identification models for different area information.

S302. The NWDAF collects characteristic information of a service flow from a communication network (for example, a UPF), where the collected characteristic information of the service flow may be shown in Table 1. It should be noted that in this embodiment of this application, traffic information provided by the UPF is in granularity of an IP 5-tuple, that is, in granularity of a service data flow. Information included in the IP 5-tuple includes: a terminal IP address, a terminal port number, a server IP address, a server port number, and a protocol number.

TABLE 1

| Data | Data source | Description |
|---|---|---|
| >SUPI | SMF | Terminal identifier |
| >S-NSSAI | SMF | Slice |
| >DNN | SMF | >DNN |
| >IP 5-tuple | SMF | Service flow identifier |
| >Traffic information of a service flow | | |
| >>Start/end time | SMF/UPF | Start/end time |
| >>Data volume | SMF/UPF | Traffic volume (UL/DL) |
| >>Data duration | SMF/UPF | Traffic duration (UL/DL) |
| >>QoS flow Bit Rate | SMF/UPF | Observation bandwidth (UL/DL) |
| >>Quantity of IP packets | SMF/UPF | Quantity of observation packets (per UL/DL) |
| >>Average interval of an IP packet | SMF/UPF | Average interval of an IP packet, where the quantity of IP packets/the Data duration = the average interval of the IP packet |
| >>Average size of the IP packet | SMF/UPF | Average size of the IP packet, where a totalsize of the IP packet/the quantity of IP packets = the average size of the IP packet |

S303. The NWDAF collects service information from an application server (for example, an AF), where the collected service information is shown in Table 2. Traffic information provided by the AF in granularity of an IP 5-tuple, that is, in granularity of a service data flow. Information included in the IP 5-tuple includes: a terminal IP address, a terminal port number, a server IP address, a server port number, and a protocol number.

TABLE 2

| Data | Data source | Description |
|---|---|---|
| >IP 5-tuple | AF | a service flow identifier, and the IP 5-tuple includes: a terminal IP address, a terminal port number, a server IP address, a server port number, and a protocol number. |
| >Traffic information of a service flow | | |
| >>Start/end time | AF | Start/end time |
| >>Frame type | AF | The frame type is used for identifying an I frame or a non-I frame (for example, a P frame and a B frame) |
| >>Importance level | AF | The importance level is used for identifying an importance level of a service flow, for example, importance of an I frame service flow is high, and importance of a non-I frame service flow is medium. |
| >>ADU identifier | AF | The ADU identifier is used for identifying that the service flow belongs to an ADU (Application Data Unit), which is unique in a QoS service flow. |
| >>Data volume | AF | Traffic volume (UL/DL) |
| >>Data duration | AF | Traffic duration (UL/DL) |
| >>QoS flow Bit Rate | AF | Observation bandwidth (UL/DL) |
| >>Service experience | AF | User service subjective experience feeling score, for example, a service staff MOS (MeanOpinion Score) |

S304. The NWDAF generates a training data set and trains a service traffic characteristic model ML Model based on the data obtained from the AF and the communication network. For example, the NWDAF trains the service traffic characteristic model ML Model based on training data and determines an importance level of a packet and an application data unit of the packet, to ensure user experience.

It should be noted that, S302 to S304 may be executed after S301, for example, after receiving the request message, the NWDAF determines that there is currently no service traffic characteristic model for a requested service flow, and executes S302 to S304, to train a corresponding service traffic characteristic model. In some embodiments, S302 to S304 may be executed before S301, for example, the NWDAF pre-trains a corresponding service traffic characteristic model for each possible service flow, or before S301, the NWDAF has trained a corresponding service traffic characteristic model before receiving a request message of a same service flow, and executes S305 after receiving the request message sent in S301.

S305. The NWDAF collects traffic characteristic information of the target service flow from the communication network (for example, the UPF), where content included in the traffic characteristic information of the target service flow is shown in Table 1. The collected traffic characteristic information of the target service flow is used as input data, and the input data is inputted into the service traffic characteristic model ML Model, to obtain a traffic characteristic analysis result outputted by the model, where the traffic characteristic analysis result outputted by the model may be shown in Table 3.

S306. The NWDAF sends a request response message (for example, Nnwdaf_AnalyticsSubscription_Notify) to the NF Consumer, to notify the NF Consumer of the service traffic characteristic analysis result, so that when scheduling the service flow, the communication network considers the service traffic characteristic analysis result.

TABLE 3

| Information | Description |
|---|---|
| >IP 5-tuple | Service flow identifier, |
| >Start/end time | Start/end time |
| >App ID | Application identifier |
| >Data duration | Traffic duration (UL/DL) |
| >Importance | The importance is used for identifying importance of a service flow, for example, importance of an I frame service flow is high, and importance of a non-I frame service flow is medium. |
| >ADU identifier | The ADU identifier is used for identifying that the service flow belongs to an ADU (Application Data Unit), which is unique in a QoS service flow. |

By using the method provided in this embodiment of this application, for a service flow (for example, an XR service flow) carried in a same QoS flow, the communication network identifies, in a Deep Flow Inspection (DFI) manner, an APP ID of the service flow, importance of the service flow, and a data unit to which the service flow belongs, to perform optimization measures (for example, scheduling optimization) to improve service experience.

Figures 4, 5:
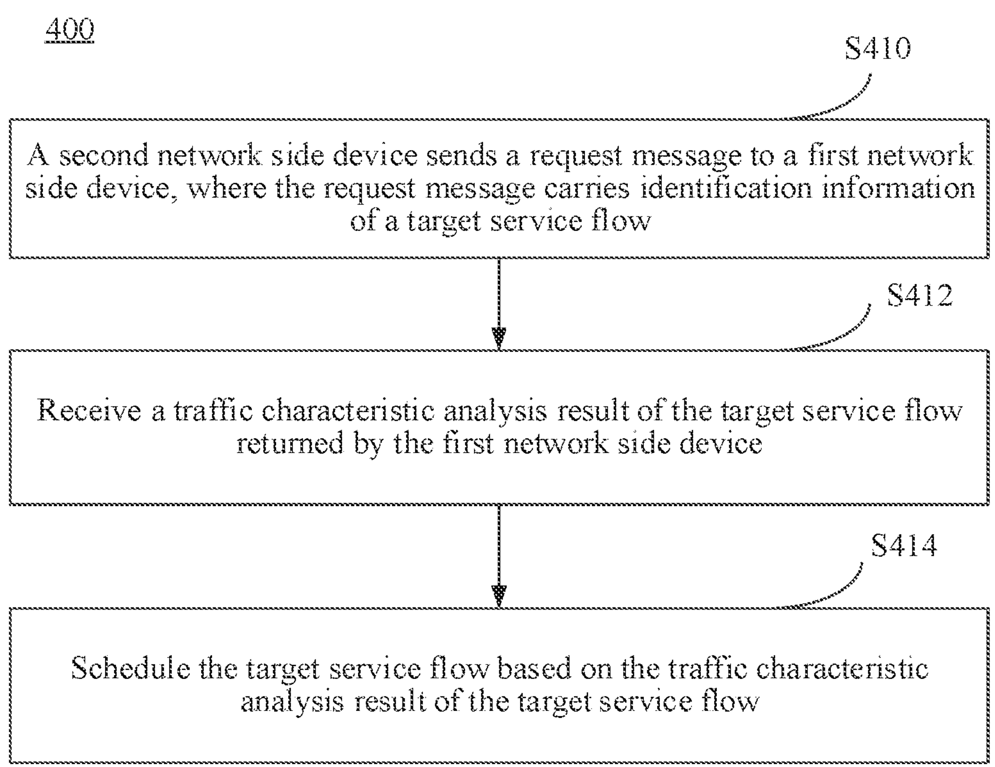
FIG. 4 is a flowchart of a service flow scheduling method according to an embodiment of this application.
FIG. 5 is a schematic structural diagram of an apparatus for obtaining a traffic characteristic analysis result according to an embodiment of this application.

FIG. 4 is a schematic flowchart of a service flow scheduling method 400 according to an embodiment of this application. The method 400 may be performed by a first network side device. In other words, the method may be performed by software or hardware installed on the first network side device. As shown in FIG. 4, the method may include the following steps.

S410. A second network side device sends a request message to a first network side device, where the request message carries identification information of a target service flow.

The request message is the same as the request message in the method 200 and the method 300. For details, refer to the related descriptions in the method 200 and the method 300. Details are not described herein again.

S412. Receive a traffic characteristic analysis result of the target service flow returned by the first network side device, where the traffic characteristic analysis result includes: first indication information and/or second indication information, the first indication information indicates importance of the target service flow, and the second indication information indicates a data unit to which the target service flow belongs.

The first network side device may obtain the traffic characteristic analysis result in the manner described in the method 200 and the method 300. For details, refer to the related descriptions in the method 200 and the method 300. Details are not described herein again.

S414. Schedule the target service flow based on the traffic characteristic analysis result of the target service flow.

In an implementation, S414 may include: sending, by the second network side device, the traffic characteristic analysis result to a third network side device, to indicate the third network side device to schedule the target service flow based on the traffic characteristic analysis result of the target service flow. That is, in the implementation, the second network side device sends the traffic characteristic analysis result to the third network side device such as a wireless base station device, and the third network side device schedules the target service flow based on the traffic characteristic analysis result of the target service flow.

In an implementation, the scheduling the target service flow based on the traffic characteristic analysis result of the target service flow may include: scheduling the target service flow for transmission based on the importance indicated by the first indication information. For example, a target service flow with high importance is scheduled for transmission.

In an implementation, the scheduling the target service flow based on the traffic characteristic analysis result of the target service flow may include: scheduling each target service flow belonging to a same data unit for transmission based on the second indication information, or skipping transmitting each target service flow belonging to a same data unit. For example, if a current network resource can schedule the target service flow belonging to a data unit, the network resource schedules the target service flow belonging to the data unit for transmission. If the current network resource cannot schedule one or more target service flow belonging to a data unit, the network resource skips transmitting all the target service flows of the data unit.

In an implementation, in a case that the traffic characteristic analysis result includes the first indication information and the second indication information, the target service flow may be scheduled based on importance of each target service flow and a data unit to which the target service flow belongs. For example, when importance of a to-be-scheduled target service flow is relatively high, a current network resource may also transmit all target service flows in a data unit to which the target service flow belongs, and may schedule all the target service flows included in the data unit. If the current network resource cannot transmit a target service flow in the data unit to which the target service flow belongs, the current network resource skips transmitting all the target service flows included in the data unit.

By using the method provided in this embodiment of this application, scheduling optimization may be performed based on the obtained traffic characteristic analysis result of the service flow, to improve the service experience.

It should be noted that, the method for obtaining a traffic characteristic analysis result provided in this embodiment of this application may be performed by an apparatus for obtaining a traffic characteristic analysis result, or may be performed by a control module in an apparatus for obtaining a traffic characteristic analysis result configured to perform the method for obtaining a traffic characteristic analysis result. In this embodiment of this application, an example in which the apparatus for obtaining a traffic characteristic analysis result performs the method for obtaining a traffic characteristic analysis result is used for describing the apparatus for obtaining a traffic characteristic analysis result provided in this embodiment of this application.

FIG. 5 is a schematic structural diagram of an apparatus 500 for obtaining a traffic characteristic analysis result according to an embodiment of this application. As shown in FIG. 5, the apparatus 500 may include: a first receiving module 501, a first obtaining module 502, and a second obtaining module 503.

In this embodiment of this application, the first receiving module 501 is configured to receive a request message sent by a second network side device, where the request message carries identification information of a target service flow. The first obtaining module 502 is configured to obtain traffic characteristic information of the target service flow from a communication network based on the identification information of the target service flow. The second obtaining module 503 is configured to obtain a traffic characteristic analysis result of the target service flow based on the traffic characteristic information of the target service flow, where the traffic characteristic analysis result includes: first indication information and/or second indication information, the first indication information indicates importance of the target service flow, and the second indication information indicates a data unit to which the target service flow belongs.

In an implementation, that the second obtaining module 503 obtains a traffic characteristic analysis result of the target service flow based on the traffic characteristic information of the target service flow includes:

inputting the traffic characteristic information of the target service flow into a service traffic characteristic model, and obtaining the traffic characteristic analysis result of the target service flow by using the service traffic characteristic model, where the service traffic characteristic model is configured to analyze and output a corresponding traffic characteristic analysis result according to inputted traffic characteristic information.

In another implementation, as shown in FIG. 5, the apparatus may further include:

a training module 504, configured to collect traffic characteristic information of a sample service flow from the communication network; collect service information of the sample service flow from an application server; and train the service traffic characteristic model based on the collected traffic characteristic information of the sample service flow and the collected service information of the sample service flow, to enable the service traffic characteristic model to analyze and output the corresponding traffic characteristic analysis result according to the inputted traffic characteristic information.

In an implementation, the service information includes: a service flow identifier and first traffic information of a service flow, where the first traffic information of the service flow includes: indication information indicating importance of the service flow and/or indication information indicating a data unit to which the service flow belongs.

In an implementation, the first traffic information of the service flow further includes at least one of the following: indication information indicating a frame type of the service flow, a start time and/or an end time of the service flow, a traffic volume of the service flow, a traffic duration of the service flow, or an observation bandwidth of the service flow.

In an implementation, the traffic characteristic information includes: the service flow identifier and second traffic information of the service flow, where the second traffic information of the service flow includes at least one of the following: the start time and/or the end time of the service flow, the traffic volume of the service flow, the traffic duration of the service flow, the observation bandwidth of the service flow, a quantity of observation packets of the service flow, an average interval of an IP packet, or an average size of the IP packet.

In an implementation, the service flow identifier includes: a terminal IP address, a terminal port number, a server IP address, a server port number, and a protocol number.

In an implementation, the traffic characteristic analysis result further includes at least one of the following: a service flow identifier, a start time and/or an end time of a service flow, an application identifier of the service flow, or a traffic duration of the service flow.

In another implementation, as shown in FIG. 5, the apparatus may further include:

a first sending module 505, configured to send the traffic characteristic analysis result of the target service flow to the second network side device or a third network side device.

In an implementation, the data unit includes: an application data unit.

In an implementation, the identification information includes at least one of the following: a service flow feature identifier, an application identifier, a slice identifier, a data network name, or area information.

The apparatus for obtaining a traffic characteristic analysis result in this embodiment of this application may be an apparatus, or may be a component, an integrated circuit, or a chip in a network side device.

The apparatus for obtaining a traffic characteristic analysis result in this embodiment of this application may be an apparatus with an operating system. The operating system may be an Android operating system, an ios operating system, or another operating system. This is not specifically limited in this embodiment of this application.

The apparatus for obtaining a traffic characteristic analysis result provided in this embodiment of this application can implement the processes implemented in the method embodiments of FIG. 2 and FIG. 3, and achieve the same technical effects. To avoid repetition, details are not described herein again.

Figure 6:
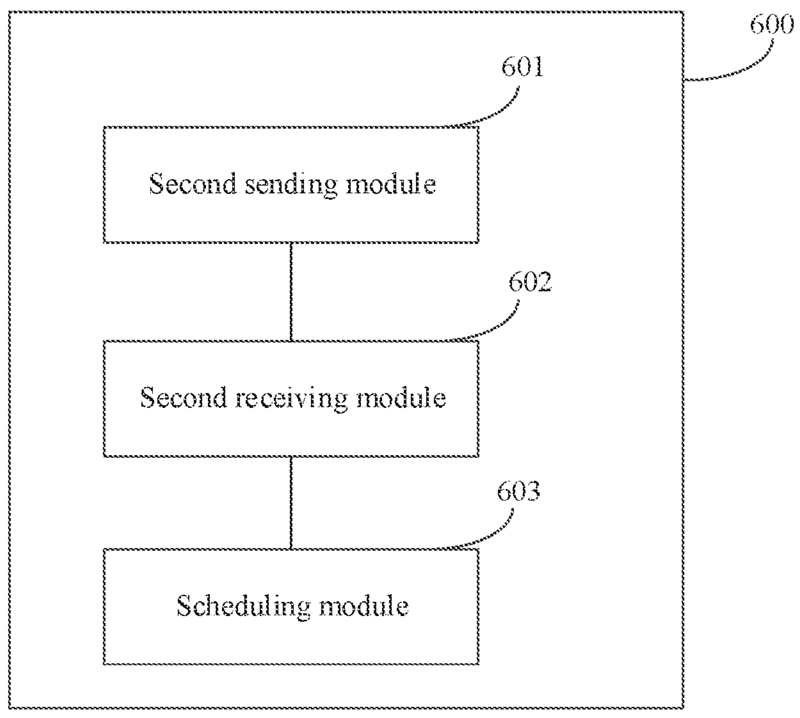
FIG. 6 is a schematic structural diagram of a service flow scheduling apparatus according to an embodiment of this application.

FIG. 6 is a schematic structural diagram of a service flow scheduling apparatus 600 according to an embodiment of this application. As shown in FIG. 6, the apparatus 600 mainly includes: a second sending module 601, a second receiving module 602, and a scheduling module 603.

In this embodiment of this application, the second sending module 601 is configured to send a request message to a first network side device, where the request message carries identification information of a target service flow. The second receiving module 602 is configured to receive a traffic characteristic analysis result of the target service flow returned by the first network side device, where the traffic characteristic analysis result includes: first indication information and/or second indication information, the first indication information indicates importance of the target service flow, and the second indication information indicates a data unit to which the target service flow belongs. The scheduling module 603 is configured to schedule the target service flow based on the traffic characteristic analysis result of the target service flow.

In an implementation, that the scheduling module 603 schedules the target service flow based on the traffic characteristic analysis result of the target service flow includes:

sending the traffic characteristic analysis result to a third network side device, to indicate the third network side device to schedule the target service flow based on the traffic characteristic analysis result of the target service flow.

In an implementation, that the scheduling module 603 schedules the target service flow based on the traffic characteristic analysis result of the target service flow includes:

scheduling the target service flow for transmission based on the importance indicated by the first indication information.

In an implementation, that the scheduling module 603 schedules the target service flow based on the traffic characteristic analysis result of the target service flow includes:

scheduling each target service flow belonging to a same data unit for transmission based on the second indication information, or skipping transmitting each target service flow belonging to a same data unit.

The service flow scheduling apparatus in this embodiment of this application may be an apparatus with an operating system. The operating system may be an Android operating system, an ios operating system, or another operating system. This is not specifically limited in this embodiment of this application.

The service flow scheduling apparatus provided in this embodiment of this application can implement the processes implemented in the method embodiment of FIG. 4 and achieve the same technical effects. To avoid repetition, details are not described herein again.

Figure 7:
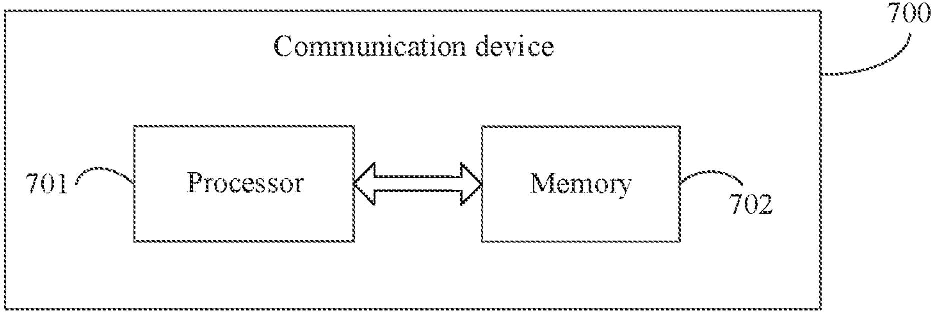
FIG. 7 is a schematic structural diagram of a communication device according to an embodiment of this application.

As shown in FIG. 7, an embodiment of this application further provides a communication device 700, including a processor 701, a memory 702, and a program or instructions stored in the memory 702 and executable on the processor 701. For example, when the communication device 700 is a network side device, the program or the instructions are executed by the processor 701 to implement the processes of the foregoing embodiments of the method for obtaining a traffic characteristic analysis result, and the same technical effects can be achieved, or implement the processes of the embodiment of the service flow scheduling method, and the same technical effects can be achieved. To avoid repetition, details are not described herein again.

An embodiment of this application further provides a network side device, including a processor and a communication interface. The processor is configured to implement the processes of the foregoing embodiments of the method for obtaining a traffic characteristic analysis result, or implement the processes of the embodiment of the service flow scheduling method, and the communication interface is configured to communicate with an external communication device. The embodiment of the network side device corresponds to the method embodiment of the network side device, and the implementation processes and the implementations of the foregoing method embodiments are applicable to the embodiment of the network side device and can achieve the same technical effects.

Figure 8:
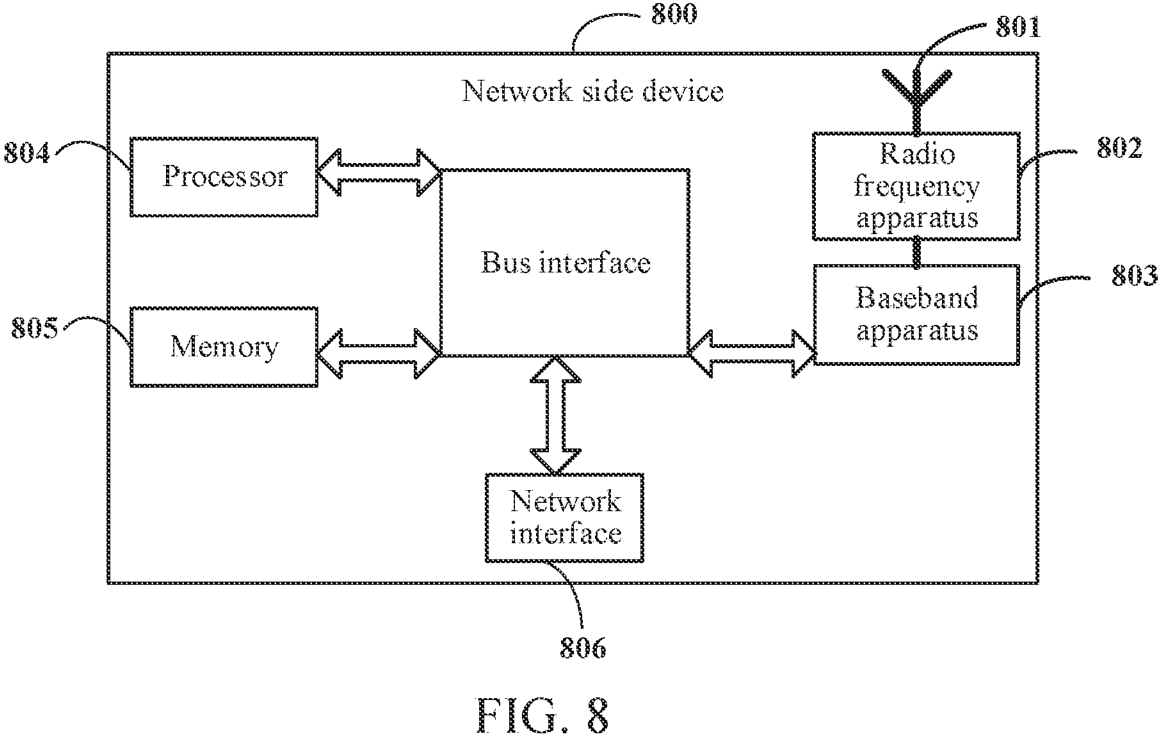
FIG. 8 is a schematic diagram of a hardware structure of a network side device according to an embodiment of this application.

An embodiment of this application further provides a network side device 800. As shown in FIG. 8, the network side device 800 includes: an antenna 801, a radio frequency apparatus 802, and a baseband apparatus 803. The antenna 801 is connected to the radio frequency apparatus 802. In an uplink direction, the radio frequency apparatus 802 receives, by using the antenna 801, information, and sends the received information to the baseband apparatus 803 for processing. In a downlink direction, the baseband apparatus 803 processes to-be-sent information, and sends the information to the radio frequency apparatus 802. The radio frequency apparatus 802 processes the received information and sends out the information by using the antenna 801.

The frequency band processing apparatus may be located in the baseband apparatus 803, the methods performed by the network side device in the foregoing embodiments may be implemented in the baseband apparatus 803, and the baseband apparatus 803 includes a processor 804 and a memory 805.

The baseband apparatus 803 may include, for example, at least one baseband plate. A plurality of chips are disposed on the baseband plate. As shown in FIG. 8, one of the plurality of chips is, for example, the processor 804, and is connected to the memory 805, to invoke a program in the memory 805 to perform operations of the network device in the foregoing method embodiment.

The baseband apparatus 803 may further include a network interface 806, configured to exchange information with the radio frequency apparatus 802. The interface is, for example, a common public radio interface (CPRI).

The network side device in this embodiment of the present application further includes: instructions or a program stored in the memory 805 and executable on the processor 804, the processor 804 invokes the instructions or the program in the memory 805 to perform the methods performed by the modules in FIG. 5 or FIG. 6, and the same technical effects are achieved. To avoid repetition, details are not described herein again.

An embodiment of this application further provides a readable storage medium, storing a program or instructions, where the program or the instructions are executed by a processor to implement the processes of the foregoing embodiments of the method for obtaining a traffic characteristic analysis result, and the same technical effects can be achieved, or implement the processes of the embodiment of the service flow scheduling method, and the same technical effects can be achieved. To avoid repetition, details are not described herein again.

The processor is the processor in the terminal in the foregoing embodiments. The readable storage medium includes a computer-readable storage medium such as a computer Read-Only Memory (ROM), a Random Access Memory (RAM), a magnetic disk, or an optical disc.

An embodiment of this application further provides a chip, including a processor and a communication interface, where the communication interface is coupled to the processor, and the processor is configured to run a program or instructions, to implement the processes of the foregoing embodiments of the method for obtaining a traffic characteristic analysis result, and the same technical effects can be achieved, or implement the processes of the embodiment of the service flow scheduling method, and the same technical effects can be achieved. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program/program product, stored in a non-transient storage medium, where the program/program product is executed by at least one processor to implement the processes of the foregoing embodiments of the method for obtaining a traffic characteristic analysis result, and the same technical effects can be achieved, or implement the processes of the embodiment of the service flow scheduling method, and the same technical effects can be achieved. To avoid repetition, details are not described herein again.

It should be noted that, the terms “include”, “including”, or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence “including one” does not exclude that there are still other same elements in the processes, methods, objects, or apparatuses. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and may also be implemented by hardware, but in many cases, the former manner is a better implementation. Based on such an understanding, the technical solutions of this application essentially or the part contributing to the related art may be implemented in the form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A method for obtaining a traffic characteristic analysis result, comprising:

receiving, by a first network side device, a request message sent by a second network side device, wherein the request message carries identification information of a target service flow;

obtaining, by the first network side device, traffic characteristic information of the target service flow from a communication network based on the identification information of the target service flow;

obtaining a traffic characteristic analysis result of the target service flow based on the traffic characteristic information of the target service flow, wherein the traffic characteristic analysis result comprises: first indication information and second indication information, the first indication information indicates importance of the target service flow, and the second indication information indicates an application data unit to which the target service flow belongs; and sending the traffic characteristic analysis result of the target service flow to the second network side device or a third network side device, and instructing the second network side device or the third network side device to schedule the target service flow based on the traffic characteristic analysis result of the target service flow.

2. The method according to claim 1, wherein obtaining the traffic characteristic analysis result of the target service flow based on the traffic characteristic information of the target service flow comprises:

inputting the traffic characteristic information of the target service flow into a service traffic characteristic model; and obtaining the traffic characteristic analysis result of the target service flow by using the service traffic characteristic model, wherein the service traffic characteristic model is configured to analyze and output a corresponding traffic characteristic analysis result according to inputted traffic characteristic information.

3. The method according to claim 2, wherein before obtaining the traffic characteristic analysis result of the target service flow based on the traffic characteristic information of the target service flow, the method further comprises:

collecting traffic characteristic information of a sample service flow from the communication network;

collecting service information of the sample service flow from an application server; and training the service traffic characteristic model based on the collected traffic characteristic information of the sample service flow and the collected service information of the sample service flow, to enable the service traffic characteristic model to analyze and output the corresponding traffic characteristic analysis result according to the inputted traffic characteristic information.

4. The method according to claim 3, wherein the service information comprises: a service flow identifier and first traffic information of a service flow, wherein the first traffic information of the service flow comprises: indication information indicating importance of the service flow or indication information indicating a data unit to which the service flow belongs.

5. The method according to claim 4, wherein the first traffic information of the service flow further comprises at least one of the following: indication information indicating a frame type of the service flow, a start time or an end time of the service flow, a traffic volume of the service flow, a traffic duration of the service flow, or an observation bandwidth of the service flow.

6. The method according to claim 1, wherein the traffic characteristic information comprises: the service flow identifier and second traffic information of the service flow, wherein the second traffic information of the service flow comprises at least one of the following: the start time or the end time of the service flow, the traffic volume of the service flow, the traffic duration of the service flow, the observation bandwidth of the service flow, a quantity of observation packets of the service flow, an average interval of an IP packet, or an average size of the IP packet.

7. The method according to claim 6, wherein the service flow identifier comprises: a terminal IP address, a terminal port number, a server IP address, a server port number, and a protocol number; and the traffic characteristic analysis result further comprises at least one of the following: the service flow identifier, the start time or the end time of a service flow, an application identifier of the service flow, or the traffic duration of the service flow.

8. The method according to claim 1, wherein the identification information comprises at least one of the following: a service flow feature identifier, an application identifier, a slice identifier, a data network name, or area information.

9. A method for scheduling service flow, comprising:

sending, by a second network side device, a request message to a first network side device, wherein the request message carries identification information of a target service flow;

receiving a traffic characteristic analysis result of the target service flow returned by the first network side device, wherein the traffic characteristic analysis result comprises: first indication information and second indication information, the first indication information indicates importance of the target service flow, and the second indication information indicates an application data unit to which the target service flow belongs; and scheduling the target service flow based on the traffic characteristic analysis result of the target service flow.

10. The method according to claim 9, wherein scheduling the target service flow based on the traffic characteristic analysis result of the target service flow comprises:

sending, by the second network side device, the traffic characteristic analysis result to a third network side device, to indicate the third network side device to schedule the target service flow based on the traffic characteristic analysis result of the target service flow.

11. The method according to claim 9, wherein scheduling the target service flow based on the traffic characteristic analysis result of the target service flow comprises:

scheduling the target service flow for transmission based on the importance indicated by the first indication information; or scheduling each target service flow belonging to a same data unit for transmission based on the second indication information, or skipping transmitting each target service flow belonging to a same data unit.

12. A network side device, wherein the network side device is a first network side device, comprising: a memory storing a computer program; and a processor coupled to the memory and configured to execute the computer program to perform operations comprising:

receiving a request message sent by a second network side device, wherein the request message carries identification information of a target service flow;

obtaining traffic characteristic information of the target service flow from a communication network based on the identification information of the target service flow;

obtaining a traffic characteristic analysis result of the target service flow based on the traffic characteristic information of the target service flow, wherein the traffic characteristic analysis result comprises: first indication information and second indication information, the first indication information indicates importance of the target service flow, and the second indication information indicates an application data unit to which the target service flow belongs; and sending the traffic characteristic analysis result of the target service flow to the second network side device or a third network side device, and instructing the second network side device or the third network side device to schedule the target service flow based on the traffic characteristic analysis result of the target service flow.

13. The network side device according to claim 12, wherein obtaining the traffic characteristic analysis result of the target service flow based on the traffic characteristic information of the target service flow comprises:

inputting the traffic characteristic information of the target service flow into a service traffic characteristic model; and obtaining the traffic characteristic analysis result of the target service flow by using the service traffic characteristic model, wherein the service traffic characteristic model is configured to analyze and output a corresponding traffic characteristic analysis result according to inputted traffic characteristic information.

14. The network side device according to claim 13, wherein before obtaining the traffic characteristic analysis result of the target service flow based on the traffic characteristic information of the target service flow, the operations further comprise:

collecting traffic characteristic information of a sample service flow from the communication network;

collecting service information of the sample service flow from an application server; and training the service traffic characteristic model based on the collected traffic characteristic information of the sample service flow and the collected service information of the sample service flow, to enable the service traffic characteristic model to analyze and output the corresponding traffic characteristic analysis result according to the inputted traffic characteristic information.

15. The network side device according to claim 12, wherein the traffic characteristic information comprises: the service flow identifier and second traffic information of the service flow, wherein the second traffic information of the service flow comprises at least one of the following: the start time or the end time of the service flow, the traffic volume of the service flow, the traffic duration of the service flow, the observation bandwidth of the service flow, a quantity of observation packets of the service flow, an average interval of an IP packet, or an average size of the IP packet.

16. A network side device, wherein the network side device is a second network side device, comprising: a memory storing a computer program; and a processor coupled to the memory and configured to execute the computer program to perform the method for service flow scheduling according to claim 9.

17. The network side device according to claim 16, wherein scheduling the target service flow based on the traffic characteristic analysis result of the target service flow comprises:

sending the traffic characteristic analysis result to a third network side device, to indicate the third network side device to schedule the target service flow based on the traffic characteristic analysis result of the target service flow.

18. The network side device according to claim 16, wherein scheduling the target service flow based on the traffic characteristic analysis result of the target service flow comprises:

scheduling the target service flow for transmission based on the importance indicated by the first indication information; or scheduling each target service flow belonging to a same data unit for transmission based on the second indication information, or skipping transmitting each target service flow belonging to a same data unit.

* * * * *